US012054002B2

(12) United States Patent
Bouchard

(10) Patent No.: US 12,054,002 B2
(45) Date of Patent: Aug. 6, 2024

(54) WORKBOOK

(71) Applicant: Wipebook Corp., Carp (CA)

(72) Inventor: Francois Bouchard, Ottawa (CA)

( * ) Notice: Subject to any disclaimer, the term of this patent is extended or adjusted under 35 U.S.C. 154(b) by 146 days.

(21) Appl. No.: 17/530,280

(22) Filed: Nov. 18, 2021

(65) Prior Publication Data

US 2022/0072895 A1 Mar. 10, 2022

Related U.S. Application Data

(63) Continuation of application No. 14/498,904, filed on Sep. 26, 2014, now abandoned.

(30) Foreign Application Priority Data

Feb. 13, 2014 (CA) .................................... 2842734

(51) Int. Cl.
*B43L 1/00* (2006.01)
*B42D 1/00* (2006.01)

(52) U.S. Cl.
CPC ................ *B43L 1/00* (2013.01); *B42D 1/008* (2013.01)

(58) Field of Classification Search
CPC ................................. B43L 1/00; B42D 1/008
USPC ........................................................ 434/414
See application file for complete search history.

(56) References Cited

U.S. PATENT DOCUMENTS 4,751,111 A * 6/1988 Lee ........................ D21H 19/58 427/361
8,257,086 B1 * 9/2012 Di Carlo ................ G09B 11/04 434/162
2006/0024463 A1 * 2/2006 Gustafson ................. G09F 3/10 428/40.1
2011/0117330 A1 * 5/2011 Yamazaki ................. B43L 1/00 427/510

FOREIGN PATENT DOCUMENTS

JP 11209650 A * 8/1999
JP 2009024168 A * 2/2009

* cited by examiner

*Primary Examiner* — Robert P Bullington, Esq.
*Assistant Examiner* — Stephen Alvesteffer

(57) ABSTRACT

There is provided a workbook having a plurality of pages. Each page having a writing surface suitable for writing with a dry erasable pen and allowing erasure of the writing. The writing surface is formed on a substrate by applying layers of film. A particular embodiment uses two film layers. A first layer of water-based UV film is covered with a second layer of UV film having a gloss finish.

16 Claims, 2 Drawing Sheets

WORKBOOK

FIELD OF THE INVENTION

The present invention relates to workbooks and is particularly concerned with workbooks having erasable pages.

BACKGROUND OF THE INVENTION

There are known workbooks having pages with at least a portion thereof bearing an erasable surface. Typically, these include children's books for practicing printing or drawing. One such example is EP 0309106 (B1) published Nov. 13, 1991.

Other offerings include hybrid articles combining a dry-erasable panel along with paper pages. One example is U.S. Patent Pub. 20120129146.

SUMMARY OF THE INVENTION

An object of the present invention is to provide an improved workbook.

In accordance with an aspect of the present invention there is provided a workbook comprising a plurality of pages, each page having at least one writing surface upon which a dry-erasable pen can write and be erased for repeated use of the writing surface.

In accordance with another aspect of the present invention there is provided a workbook page having at least one writing surface upon which a dry-erasable pen can write and be erased for repeated use of the writing surface.

In accordance with a further aspect of the present invention there is provided a writing kit comprising a workbook having a plurality of pages, each page having at least one writing surface upon which a dry-erasable pen can write and be erased for repeated use of the writing surface and a pen compatible with the writing surface.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1A:
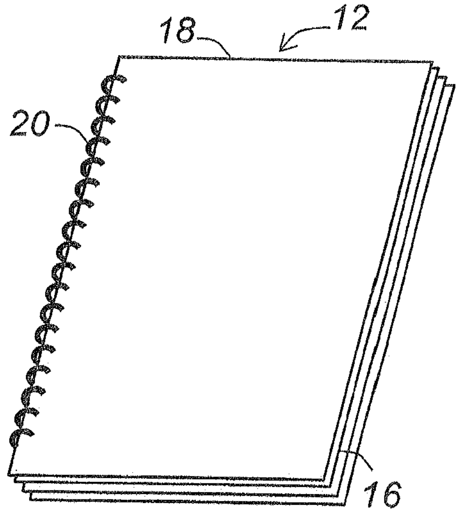
FIGS. 1*a* and 1*b* illustrate a writing kit having a workbook (FIG. 1*a*) and marker (FIG. 1*b*) in accordance with an embodiment of the present invention.
Figure 1B:
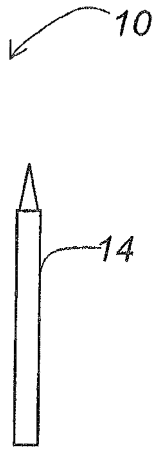

Referring to FIGS. 1*a* and 1*b* there is illustrated a writing kit having a workbook (FIG. 1*a*) in accordance with an embodiment of the present invention. The workbook kit 10 includes a workbook 12 and a dry erasable marker or correctable marker 14 (FIG. 1*b*). The workbook 10 includes a plurality of pages 16 and may include a cover 18 bound together with a binding 20. The binding 20 can be a spiral binding, a plastic comb binding, an operable binding or one having an open state and a closed state. An example of the latter binding is the GBC® PROCLICK® binding manufactured by General Binding Corporation of Northbrook Illinois, which can be opened to allow pages to be added and removed for photocopying or scanning, then closed for use of the workbook.

The dry erasable marker 14 may be any non-permanent dry erase pen. A particularly suitable marker is a hybrid marker, for example a LUMOCOLOR® correctable 305 non-permanent dry erase pen by Staedtler Mars Limited of Mississauga, Ontario.

Figure 2A:
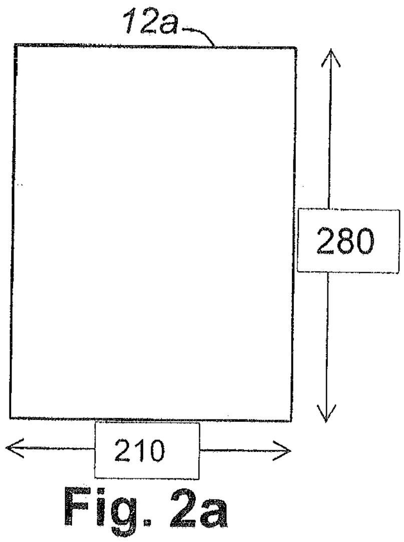
FIGS. 2*a* and 2*b* illustrate examples of two workbooks of FIG. 1*a* having different form factors.
Figure 2B:
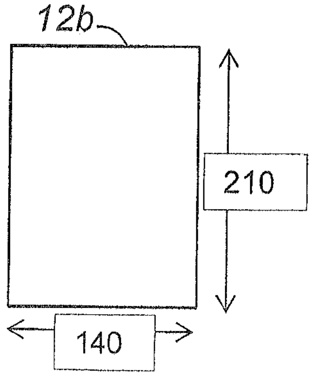

Referring to FIGS. 2*a* and 2*b* there is illustrated examples of two workbooks of FIG. 1*a* having different form factors. The two examples are a letter sized notebook 12*a* and a note pad 12*b*. The dimensions are shown in millimeters. The workbook 12*a* is 280 mm by 210 mm. The workbook 12*b* is 210 mm by 140 mm. While two examples are shown, the workbook 12 can be prepared in many different sizes depending upon the desired purpose of the workbook.

Figure 3:
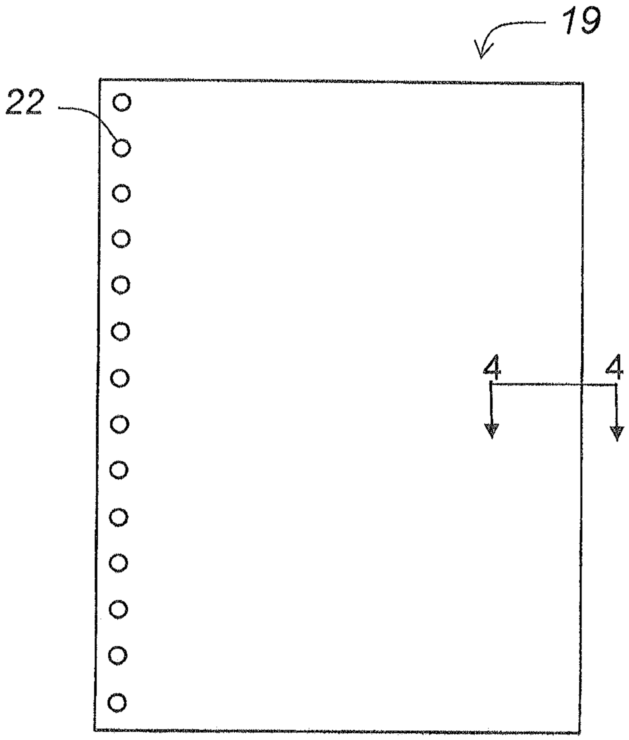
FIG. 3 illustrates a workbook page of the workbook of FIG. 1.

Referring to FIG. 3 there is illustrated a workbook page 19 of the workbook of FIG. 1*a*. The workbook page 19 includes at least one face upon which a dry erasable pen may be used to write. The writing face includes a layer of sheet material that provides a good writing surface and also allows erasure of the writing for repeated use of the workbook page. One margin of the workbook page 19 includes perforations 22 for receiving the binding 20. The binding 20 may be any suitable binding, for example a metal or plastic spiral binding, a plastic comb binding or an operable binding. While the perforations 22 are illustrated as circular, it will be appreciated that the perforations may be of different shape to accommodate alternative bindings.

Figure 4:
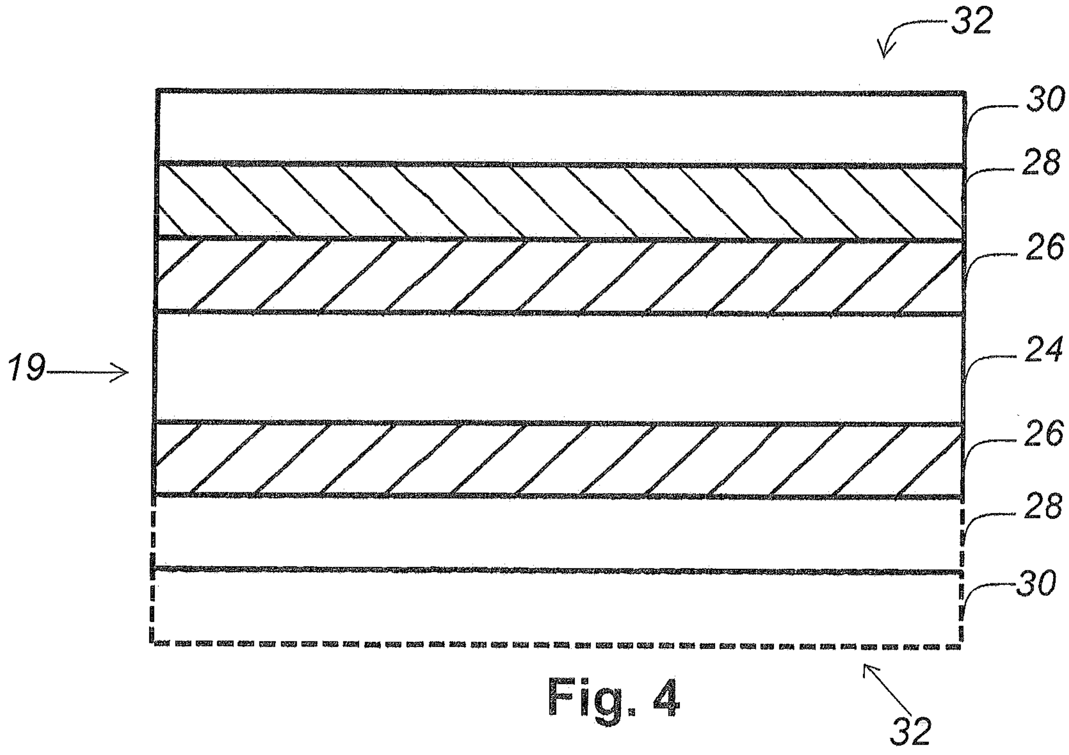
FIG. 4 illustrates in a partial cross-section through line 4-4 of the workbook page of FIG. 3.

Referring to FIG. 4 there is illustrated in a partial cross-section through line 4-4 of the workbook page of FIG. 3. The workbook page 19 includes a substrate 24 having a coating 26 on both first and second surfaces. The substrate may be selected from the group consisting of: paper, coated paper, cardboard, coated cardboard, cardstock, coated cardstock and synthetic sheet material. At least one surface includes an intermediate layer 28 and a writing surface layer 30 to provide a writing surface 32. The workbook page 19 may be single sided as shown in FIG. 4, or may optionally have a writing surface on the second face as illustrated by broken line in FIG. 4.

Details of the layers are as follows. The substrate 24 of the present embodiment is a conventional paper medium, however any suitable substrate including cardboards, card stocks, and synthetics could also be used. The paper substrate 24 was coated on both surfaces with a water-based film 26, that is the substrate 24 with the water-based film 26 was a coated paper. The water-based film had a satin finish. The writing surface 32 was prepared by applying two layers 28 and 30 to at least one surface of the water-based film 26. The layers 28 and 30 were UV films. In one example the layer 28 is a water-based UV film and the layer 30 is another UV film having a gloss finish. Specific examples of the latter film are UV 9296 and UV 9613 by Actega Kelstar Canada Inc., of Chomedey Quebec.

Alternative embodiments may use known paper-based substrate coated with film. Synthetic substrates may be selected that do not require a coating layer, in which case the coating layer 26 is omitted.

The workbook may includes pages on which one of the substrate, the first UV film and the layer there between includes printed matter, for example grids, lines, polar plots, music staff, guitar tablature and bass tablature.

Numerous modifications, variations and adaptations may be made to the particular embodiments described above without departing from the scope patent disclosure, which is defined in the claims.

What is claimed is:

1. A workbook for repeated use comprising:

a cover;

a plurality of pages disposed within the cover; and a binding coupling the cover and the plurality of pages;

each one of the plurality of pages having a substrate with first and second surfaces and at least one of the first and second surfaces having a writing surface including a first UV film, the first UV film having a gloss finish and providing a surface suitable for writing with a dry erasable pen and allowing erasure of the writing;

wherein the at least one of the first and second surfaces includes a layer between the substrate and the first UV film; and wherein the layer includes a water-based film disposed upon the at least one of the first and second surfaces, and the water-based film has a satin finish.

2. The workbook of claim 1, wherein the layer between the substrate and the first UV film includes a second UV film adjacent the first UV film.

3. The workbook of claim 2, wherein the second UV film has the same composition as the first UV film.

4. The workbook of claim 2, wherein the second UV film has a different composition than the first UV film.

5. The workbook of claim 2, wherein the second UV film has a matte finish.

6. The workbook of claim 1, wherein the substrate is selected from the group consisting of: paper, coated paper, cardboard, coated cardboard, cardstock, coated cardstock and synthetic sheet material.

7. The workbook of claim 1, wherein one of the substrate, the first UV film and the layer there between includes printed matter selected from the group consisting of: grids, lines, polar plots, music staff, guitar tablature and bass tablature.

8. A workbook page for repeated use comprising:

a substrate with first and second surfaces; and at least one of the first and second surfaces having a writing surface including a first UV film, the first UV film having a gloss finish and providing a surface suitable for writing with a dry erasable pen and allowing erasure of the writing;

wherein the at least one of the first and second surfaces includes a layer between the substrate and the first UV film; and wherein the layer includes a water-based film disposed upon the at least one of the first and second surfaces, and the water-based film has a satin finish.

9. The workbook page of claim 8, wherein the layer between the substrate and the first UV film includes a second UV film adjacent the first UV film.

10. The workbook page of claim 9, wherein the second UV film has the same composition as the first UV film.

11. The workbook page of claim 9, wherein the second UV film has a different composition than the first UV film.

12. The workbook page of claim 9, wherein the second UV film has a matte finish.

13. The workbook page of claim 8, wherein the substrate is selected from the group consisting of: paper, coated paper, cardboard, coated cardboard, cardstock, coated cardstock and synthetic sheet material.

14. The workbook page of claim 8, wherein one of the substrate, the first UV film and the layer there between includes printed matter selected from the group consisting of: grids, lines, polar plots, music staff, guitar tablature and bass tablature.

15. A writing kit comprising the workbook of claim 1 and a dry erasable pen selected for writing on the writing surface.

16. A writing kit comprising the workbook page of claim 8 and a dry erasable pen selected for writing on the writing surface.

* * * * *